(12) United States Patent
Wilson et al.

(10) Patent No.: US 12,721,306 B2
(45) Date of Patent: Sep. 1, 2026

(54) DISPENSING DEVICE FOR ANIMAL FOOD

(71) Applicant: Houndsy, Inc., Palatine, IL (US)

(72) Inventors: Luke D. Wilson, Morning View, KY (US); Pavan A. Bapu, Chicago, IL (US)

(73) Assignee: Houndsy, LLC, Palatine, IL (US)

( * ) Notice: Subject to any disclaimer, the term of this patent is extended or adjusted under 35 U.S.C. 154(b) by 0 days.

(21) Appl. No.: 19/248,012

(22) Filed: Jun. 24, 2025

(65) Prior Publication Data

US 2025/0318500 A1 Oct. 16, 2025

Related U.S. Application Data

(63) Continuation of application No. 18/736,098, filed on Jun. 6, 2024, now Pat. No. 12,356,961, which is a continuation of application No. 17/825,984, filed on May 26, 2022, now Pat. No. 12,004,490.

(60) Provisional application No. 63/193,342, filed on May 26, 2021.

(51) Int. Cl.
*A01K 5/01* (2006.01)
*B65D 83/18* (2006.01)

(52) U.S. Cl.
CPC ............ *A01K 5/0114* (2013.01); *B65D 83/18* (2025.01)

(58) Field of Classification Search
CPC .. A01K 5/0114; A01K 5/0121; A01K 5/0135; A01K 5/0142; A01K 5/02; A01K 5/0218; A01K 5/0225; B65D 83/18
See application file for complete search history.

(56) References Cited

U.S. PATENT DOCUMENTS 2,826,171 A * 3/1958 Piel ...................... A01K 5/0241 119/52.1
3,061,152 A * 10/1962 Safianoff ................ A47J 47/04 222/88
4,538,548 A * 9/1985 Page .................... A01K 5/0241 119/52.1
5,794,560 A * 8/1998 Terenzi ................ A01K 5/0291 119/51.11
6,257,288 B1 * 7/2001 Davidian ............... A01G 27/00 119/51.01
2010/0059550 A1 * 3/2010 Ciavarella ........... B05B 11/1087 222/325
2022/0378014 A1 * 12/2022 Wilson .................. B65D 83/18
2024/0410519 A1 * 12/2024 Tamulewicz ........... F16M 11/22

FOREIGN PATENT DOCUMENTS

CN 118579350 A * 9/2024 ............... A01K 7/00
GB 2223153 A * 4/1990 ........... A01K 39/026
KR 200496191 Y1 * 11/2022 ........... A01K 5/0114

* cited by examiner

*Primary Examiner* — Ebony E Evans
(74) *Attorney, Agent, or Firm* — Much Shelist P.C.

(57) ABSTRACT

A dispensing device includes a container, wherein a bottom surface of the container includes a container opening to the interior storage; first and second sliding members that engage with the first and second tracks, respectively; a bowl support connected to the first and second sliding members, and wherein the bowl support is configured to move between a filling position and a serving position; and an actuator including a body including a first end and a second end. When the first end is in a first position, the bowl support is in the filling position. When the first end is in a second position, the bowl support is in the serving position.

20 Claims, 18 Drawing Sheets

116a
104
104a
116c
110b
146
150b
150a
144
126
124
116b
104e
126
124
102e
128
128
118
120
108
106

128a
140
130
128
124
128b
152
102e
126
132
106a
108
106b
106c
106

126
128
102j
104e
126
104a
102e
106
108
102h
120
118
102j
118b
118a
124
134
126
128

116a
116c
116g
104c
116h
104
150b
144
150a
146
148
104
104e
138
116b
142
116f
116d
116e
152
108
106
104b 116a
116c
116g
104c
116h
104
150b
144
150a
146
148
142
138
104e
116b
116e
116d
116b
152
108
106
104h
116f 124
102e
126
138
142
140
(A)
(B)
(C)
(D)
(E)
128
116e
116f
130

DISPENSING DEVICE FOR ANIMAL FOOD

CROSS-REFERENCE TO RELATED APPLICATIONS

This application is a continuation of U.S. patent application Ser. No. 18/736,098, filed Jun. 6, 2024, which is a continuation of U.S. patent application Ser. No. 17/825,984, filed May 26, 2022 (now issued as U.S. Pat. No. 12,004,490), which claims the benefit of priority to U.S. Provisional Application No. 63/193,342 filed May 26, 2021, the entireties of which are hereby incorporated by reference.

BACKGROUND

The present disclosure relates to a dispensing device for animal food. More specifically, the present disclosure is directed to a dispensing device for animal food comprising a storage container that automatically fills a food bowl and includes a lever for moving the food bowl between a filling position and a serving position.

Most animal food, such as dog food, cat food, bird food, etc., is purchased in bulk and stored in a bag at a storage location, such as a garage or a pantry, within a house. To feed their pet, the pet owner typically scoops food out of the storage container, places the food into a food bowl, walks the food bowl over to a different location within the house, and sets the bowl on the ground or in a cage.

Using large containers for animal food storage presents a number of problems. Such containers occupy a lot of space in a pantry or basement, and many pet owners do not have such space to sacrifice. Storage containers are also re-closeable and used for a period of time over which the animal food dries out and loses freshness. Further, animal storage containers are often bulky and difficult to transport, which can be physically taxing on smaller people, physically disabled people, children helping with chores, or the elderly caring for companion animals. Animal food storage bags are also often easily broken into by the dog or other pet as well as by small children.

Accordingly, there is a need for a dispensing device that stores animal food in bulk and conveniently dispenses food into a food bowl for regular feedings, as described herein.

SUMMARY

To meet the needs noted above and others, the present disclosure provides a dispensing device that stores animal food in bulk and conveniently dispenses food into a food bowl for regular feedings.

In one example a dispensing device includes: a container defining an interior storage chamber, wherein a bottom surface of the container includes a container opening providing access to the interior storage chamber; one or more tracks located below the bottom surface of the container; a sliding member that engages with the one or more tracks, wherein the sliding member includes a bowl support and a bowl removeably supported by the bowl support, and wherein the sliding member is configured to move between a filling position and a serving position; and a lever including a first lever end and a second lever end, wherein the first lever end extends above the container housing and the second lever end is operably coupled to the sliding member; wherein, when the first lever end is in a first position, the sliding member is in the filling position and the bowl support aligns the bowl and the container opening; wherein, when the first lever end is in a second position, the sliding member is in the serving position and the bowl support is positioned in front of the container housing.

The dispensing device may further include a locking mechanism preventing free movement of the first level end from the first position to the second position.

The lever may further include a locking mechanism including: a first locking notch and a second locking notch located in a lever bottom end surface; a slot passing through the second lever end from a first side of the lever to a second side of the lever; a sliding member bracket including a locking pin; and a connecting pin passing through the slot and securing the sliding member bracket to the lever while enabling rotation of the sliding member bracket with respect to the lever and also enabling translation of the lever with respect to the sliding member bracket such that the connecting pin may be located towards a first end of the slot or towards a second end of the slot; wherein, when the lever is in the first position, the locking pin is located within the first locking notch and the connecting pin is located towards the first end of the slot, when the lever is in the second position, the locking pin is located within the second locking notch and the connecting pin is located towards the first end of the slot, and the connecting pin must be located towards a second end of the slot for the lever to move between the first position and the second position.

The lever may further include a lever mount secured to the container and a pivot arm, wherein a first end of the pivot arm is rotatably connected to the lever mount and a second end of the pivot arm is rotatably connected to the lever body; and wherein movement of the first lever end between the first and second positions causes the lever to rotate about the lever mount. The rotation of the lever about the lever mount may facilitate movement of the connecting pin within the slot.

The dispensing device may further include a housing defining an inner volume, wherein a bottom surface of the housing includes a housing opening providing a passage to the inner volume, wherein the container opening is aligned with the passage.

The one or more tracks may further include first and second tracks located on opposing sides of the opening on the upper side of the housing bottom surface.

The dispensing device may further include a wall surrounding a portion of the container opening below the bottom surface of the container. A first portion of the wall may be located within the passage and a second portion of the wall may be located below the bottom surface of the housing. The wall, in combination with a flexible flap, may surround the entirety of the container opening. There may be a gap between a top of the sliding member and the bottom surface of the housing.

The dispensing device may further include a rear bottom inner surface of the interior storage chamber that slopes towards the container opening.

The dispensing device may further include a front surface of the container includes a window through which a portion of the interior storage chamber can be seen.

The dispensing device may further include a sealable lid providing access to the interior storage chamber.

In another example, a dispensing device includes: a housing; a storage chamber located within the housing, the storage chamber including an opening along a bottom surface; a sliding member located beneath the storage chamber, the sliding member supporting a removeable serving bowl; a lever operable to move the sliding member between a filling position and a serving position; and a flexible flap located along the storage chamber opening and above the removeable serving bowl as the sliding member moves between the filling position and the serving position, wherein initiating movement of the lever between the filling position and the serving position requires a first force to be applied along a first vector followed by a second force applied along a second vector.

The flexible flap may contact a top of the removeable serving bowl when the sliding member moves between the filling position and the serving position. In other examples, the flexible flap does not contact the top of the removeable serving bowl when the sliding member moves between the filling position and the serving position.

The dispensing device may further include a locking mechanism requiring the first force to be applied along the first vector followed by the second force applied along the second vector when initiating movement of the lever between the filling position and the serving position.

The lever may further include a locking mechanism including: a first locking notch and a second locking notch located in a lever bottom end surface; a slot passing through the second lever end from a first side of the lever to a second side of the lever; a sliding member bracket including a locking pin; and a connecting pin passing through the slot and securing the sliding member bracket to the lever while enabling rotation of the sliding member bracket with respect to the lever and also enabling translation of the lever with respect to the sliding member bracket such that the connecting pin may be located towards a first end of the slot or towards a second end of the slot; wherein, when the lever is in the first position, the locking pin is located within the first locking notch and the connecting pin is located towards the first end of the slot, when the lever is in the second position, the locking pin is located within the second locking notch and the connecting pin is located towards the first end of the slot, and the connecting pin must be located towards a second end of the slot for the lever to move between the first position and the second position.

In another example, a dispensing device includes: a container defining an interior storage chamber, wherein a bottom surface of the container includes a container opening providing access to the interior storage chamber and a rear bottom inner surface of the interior storage chamber slopes towards the container opening, wherein a front surface of the container includes a window through which a portion of the interior storage chamber can be seen; a housing defining an inner volume, the container located within the housing, wherein the housing includes a sealable lid providing access to the interior storage chamber and a bottom surface of the housing includes a housing opening providing a passage to the inner volume, wherein the container opening is aligned with the passage; a wall surrounding a portion of the container opening below the bottom surface of the container, wherein a first portion of the wall is located within the passage and a second portion of the wall is located below the bottom surface of the housing, wherein the wall, in combination with a flexible flap, surrounds the entirety of the container opening; first and second tracks located on opposing sides of the opening on the upper side of the housing bottom surface; a sliding member that engages with the one or more tracks, wherein the sliding member includes a bowl support and a bowl removeably supported by the bowl support, and wherein the sliding member is configured to move between a filling position and a serving position; and a lever including a first lever end and a second lever end, wherein the first lever end extends above the container housing and the second lever end is operably coupled to the sliding member; wherein, when the first lever end is in a first position, the sliding member is in the filling position and the bowl support aligns the bowl and the container opening; wherein, when the first lever end is in a second position, the sliding member is in the serving position and the bowl support is positioned in front of the container housing; wherein the lever includes a locking mechanism comprising: a first locking notch and a second locking notch located in a lever bottom end surface; a slot passing through the second lever end from a first side of the lever to a second side of the lever; a sliding member bracket including a locking pin; and a connecting pin passing through the slot and securing the sliding member bracket to the lever while enabling rotation of the sliding member bracket with respect to the lever and also enabling translation of the lever with respect to the sliding member bracket such that the connecting pin may be located towards a first end of the slot or towards a second end of the slot; wherein, when the lever is in the first position, the locking pin is located within the first locking notch and the connecting pin is located towards the first end of the slot, when the lever is in the second position, the locking pin is located within the second locking notch and the connecting pin is located towards the first end of the slot, and the connecting pin must be located towards a second end of the slot for the lever to move between the first position and the second position; wherein, the lever further includes a lever mount secured to the container and a pivot arm, wherein a first end of the pivot arm is rotatably connected to the lever mount and a second end of the pivot arm is rotatably connected to the lever body; and wherein movement of the first lever end between the first and second positions causes the lever to rotate about the lever mount the rotation of the lever about the lever mount facilitates movement of the connecting pin within the slot; wherein there is a gap between a top of the sliding member and the bottom surface of the housing.

An objective of the invention is to provide a convenient and easy to use solution to the traditionally ergonomically inefficient methods of animal food storage and regular feeding routines.

An advantage of the invention is that it provides space saving options as compared to traditional methods of feeding animals.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1A:
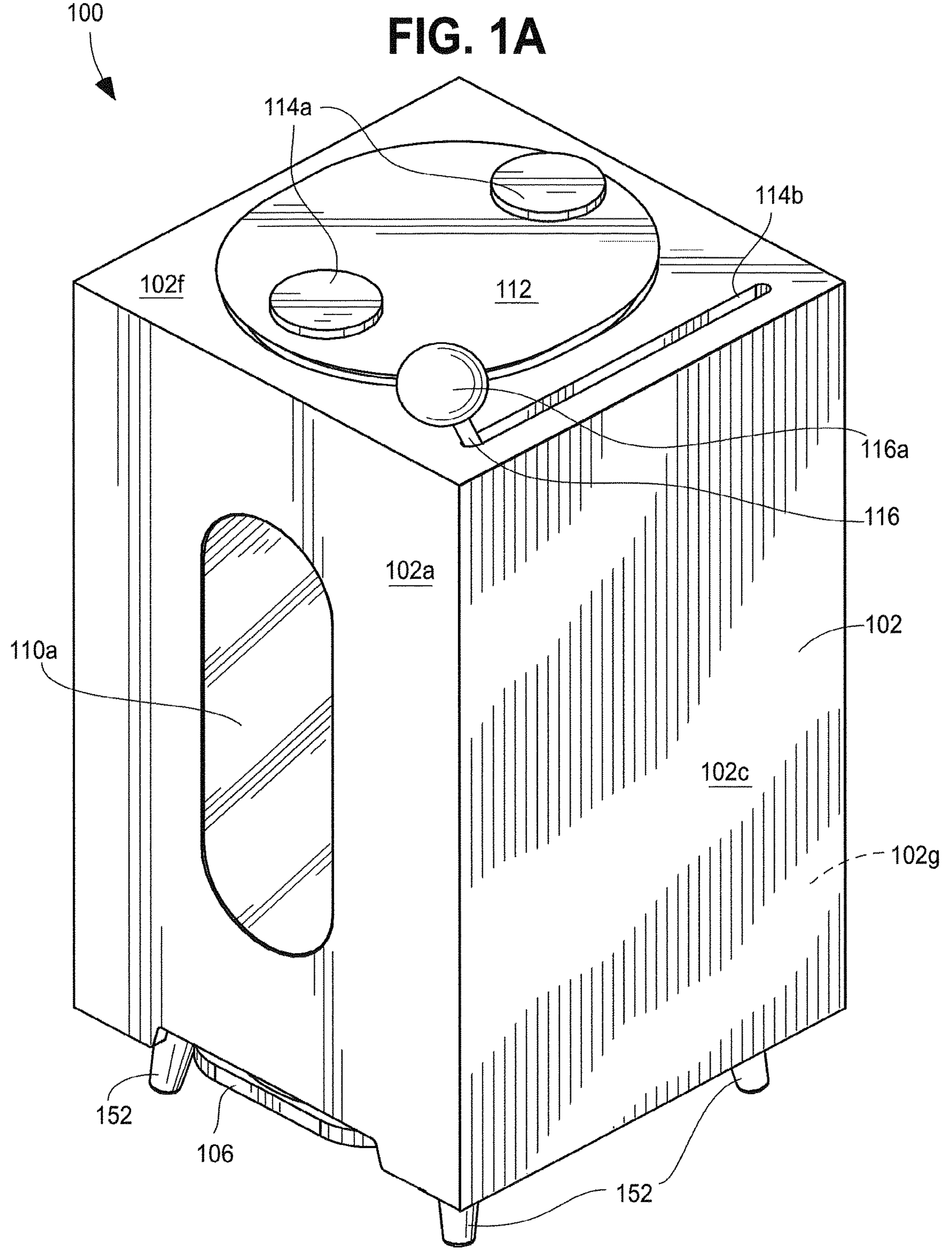
FIG. 1A is a perspective view of the dispensing device for animal food of the present application showing the sliding member and food bowl in the filling position.
Figure 1B:
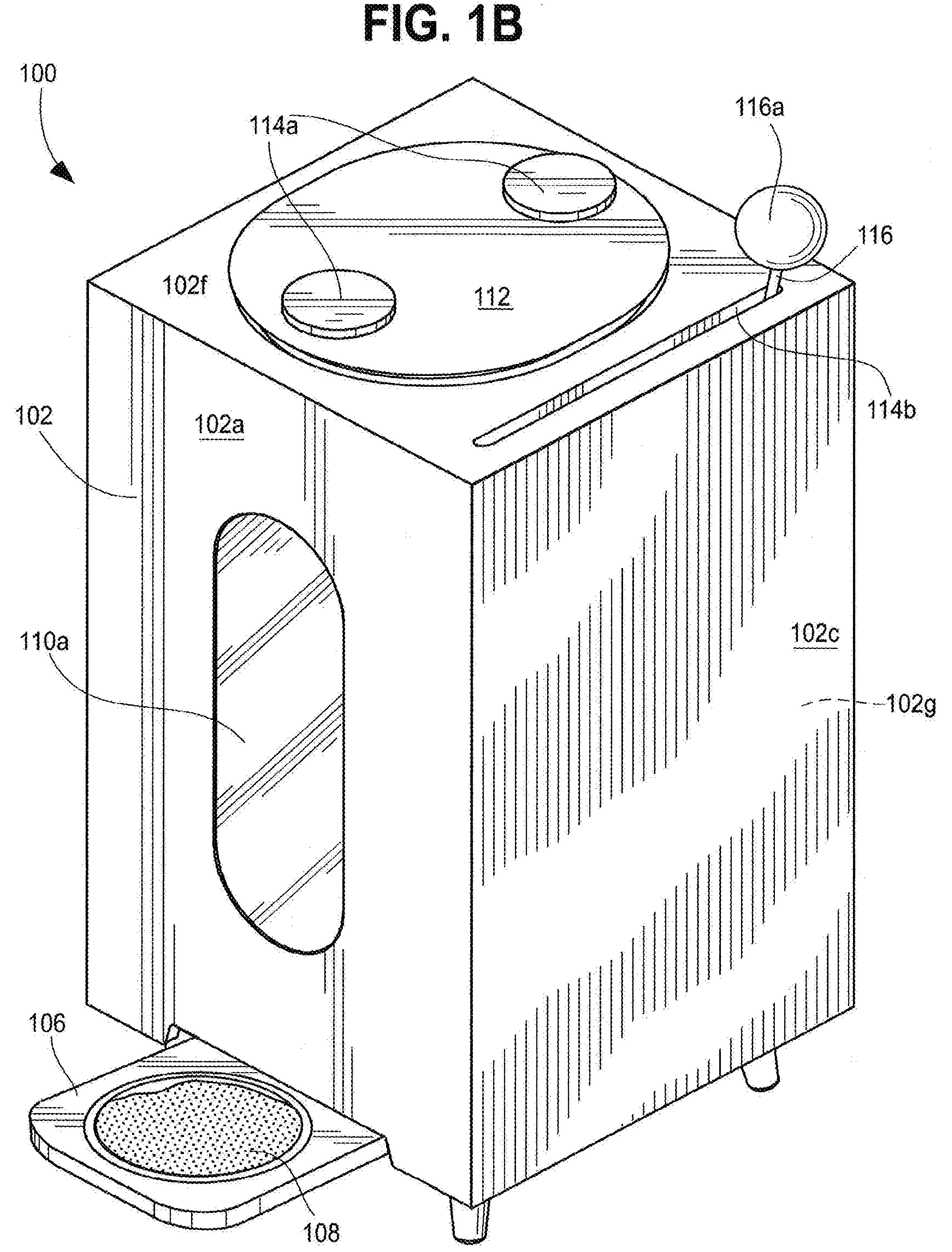
FIG. 1B is a perspective view of the dispensing device for animal food of FIG. 1A showing the sliding member and food bowl in the serving position.
Figure 2:
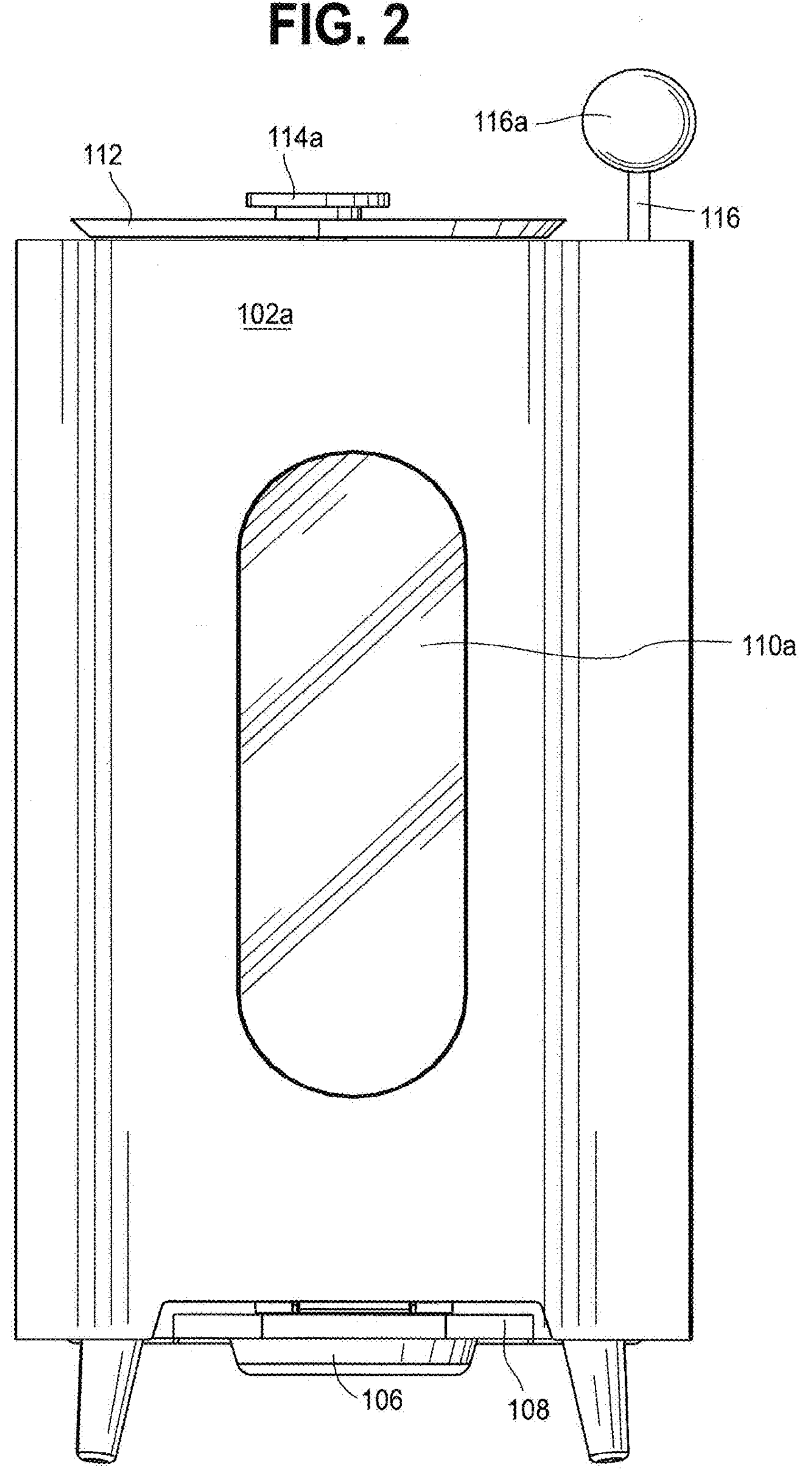
FIG. 2 is a front elevational view of the dispensing device of FIG. 1A.
Figure 3:
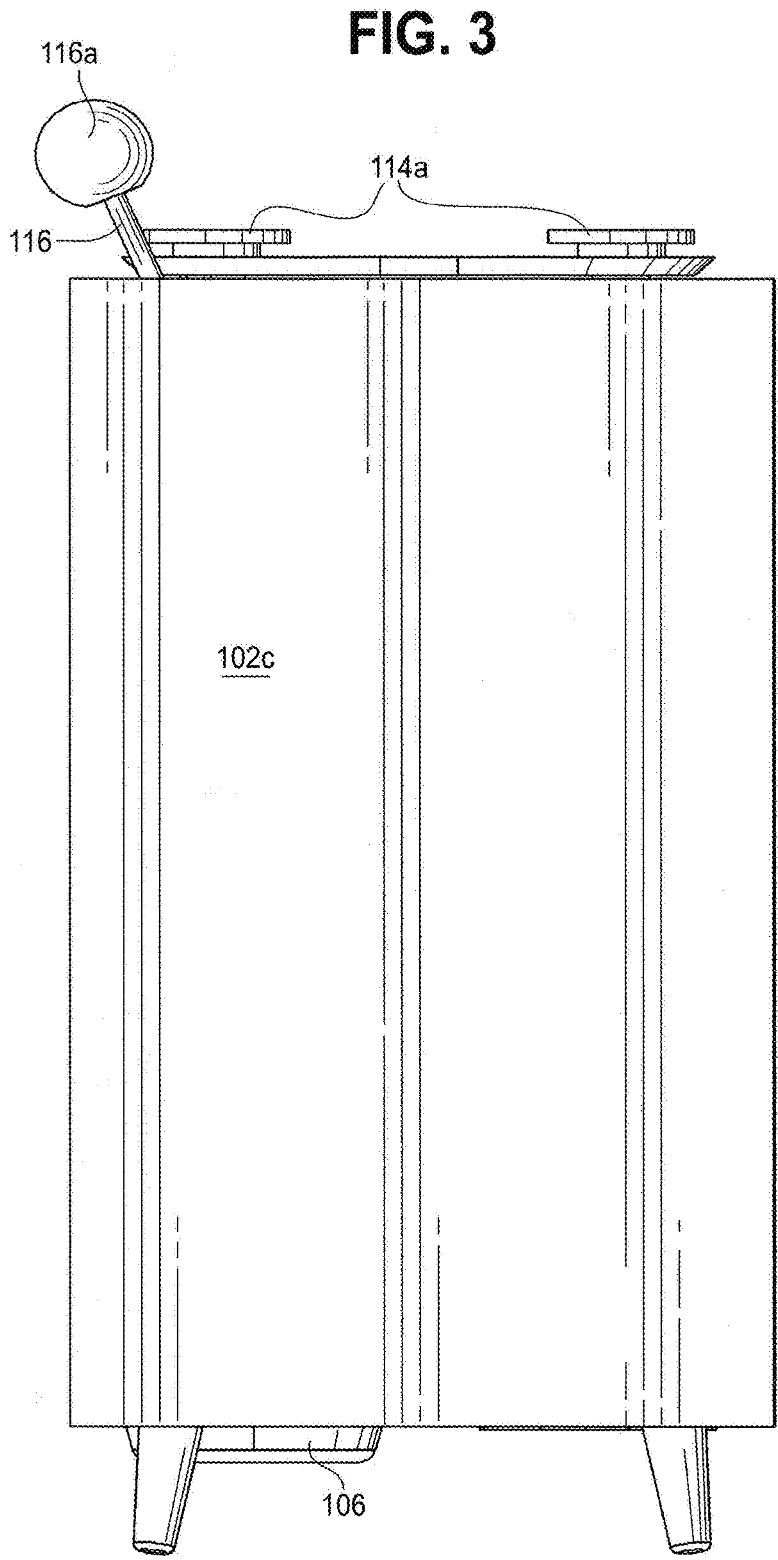
FIG. 3 is a side elevational view of the dispensing device of FIG. 1A.
Figure 4:
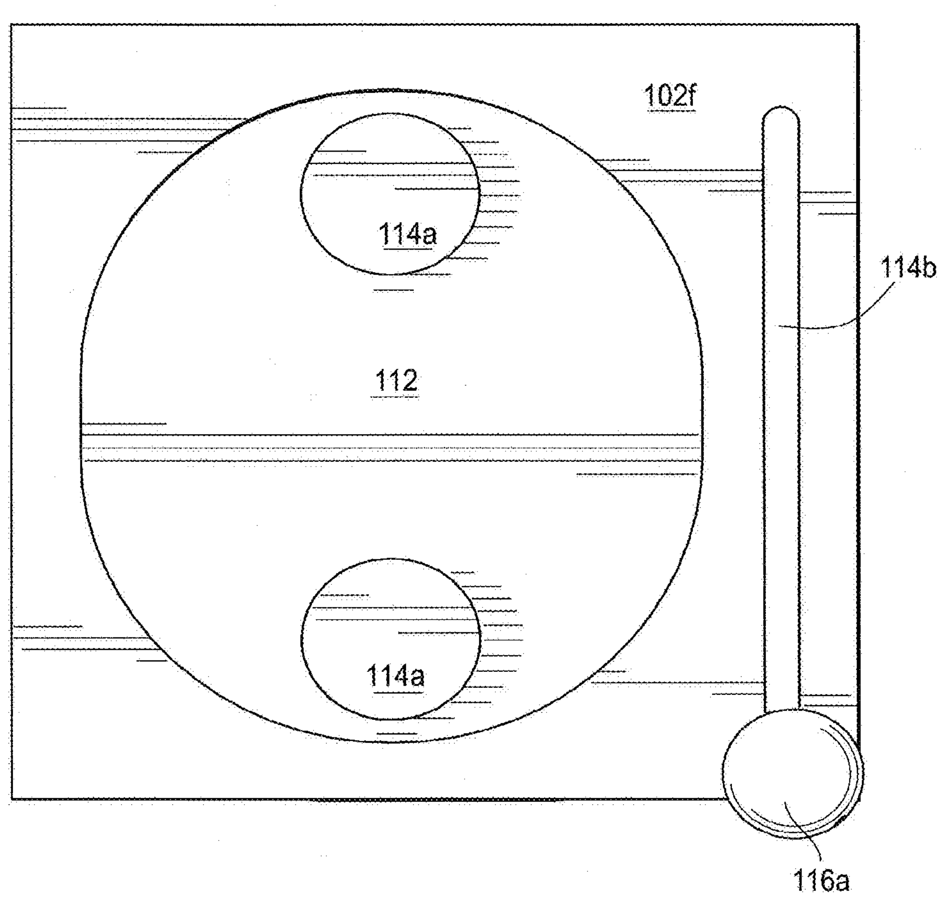
FIG. 4 is a plan view of the dispensing device of FIG. 1A.
Figure 5:
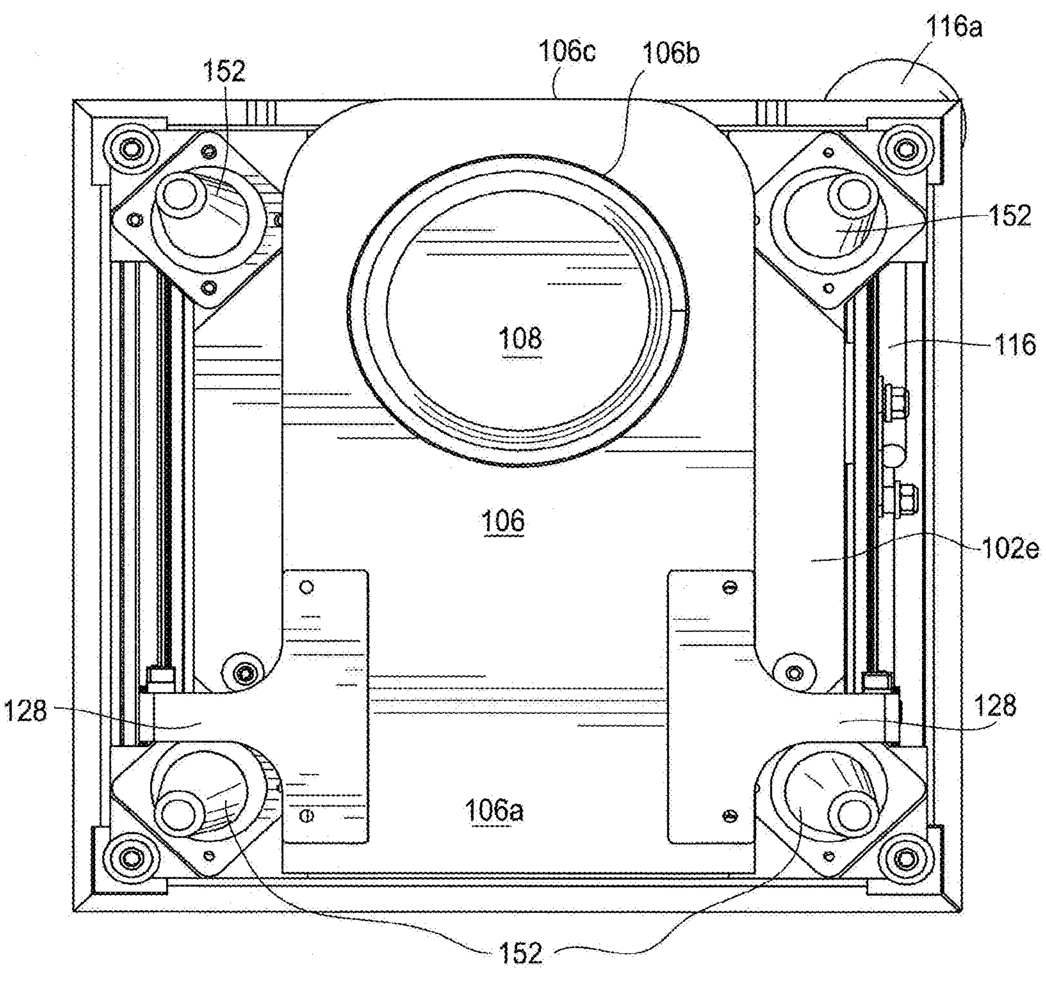
FIG. 5 is a bottom plan view of the dispensing device of FIG. 1A.

FIGS. 1A-14 illustrate an example dispensing device 100 for animal food according to the present disclosure. The dispensing device 100 includes a housing 102 in which a storage container 104 is provided, a sliding member 106 positioned below the storage container 104 that moves between a filling position and a serving position, and a lever 116 operably coupled to the sliding member 106. A removable serving bowl or food bowl 108 is positioned on the sliding member 106. When in the filling position as shown in FIG. 1A, the food bowl 108 is automatically filled from the storage container 104. When in the serving position as shown in FIG. 1B, the food bowl 108 is positioned in front of the housing 102 near the ground, allowing the pet easy access to its food. While the examples here primarily describe dispensing animal food, the invention can be used to dispense any similarly sized granular or other suitable material.

As shown in FIGS. 1A-5, the housing 102 includes a front surface 102*a*, a back surface 102*b*, opposing side surfaces 102*c*, 102*d*, a bottom surface 102*e*, and a top surface 102*f*, together defining an inner volume or storage chamber 102*g*. The bottom surface 102*e* includes a housing opening 102*h* providing a passage 102*j* (see FIGS. 10A and 10B) through which animal food moves from the inner volume 102*g* of the housing 102 into the food bowl 108, as described in greater detail below. In the illustrated embodiment, the front surface 102*a* includes a window or transparent portion 110*a* through which a portion of the interior storage chamber can be seen to allow visibility of the amount of animal food stored in the container 104.

The top surface 102*f* includes an opening through which animal food is deposited into the dispensing device 100 and a sealable lid 112 received within the opening to enclose the animal food within the dispensing device 100. The lid 112 may include one or more handles 114*a*. A slotted opening 114*b* is also provided in the top surface 102*f* through which the lever 116 extends in order to enable the user to move the sliding member 106 between the filling and serving positions.

As shown in FIGS. 6-10, the container 104 positioned within the housing 102 stores animal food. The container 104 includes a front container surface 104*a*, a rear container surface 104*b*, opposing side container surfaces 104*c*, 104*d*, and a bottom container surface 104*e* spanning bottom portions of the front, rear, and side container surfaces 104*a*-104*d*, together defining an interior storage chamber 104*g*. In some embodiments, the container 104 is sealed upon placement of the lid 112 of the housing 102 that may be removed when refilling the container is appropriate. The sealable lid 112 provides access to the interior storage chamber 104*g* of the container 104. In the illustrated embodiment, the front container surface 104*a* includes a window or transparent portion 110*b* through which a portion of the interior storage chamber 104*g* can be seen, for example, to allow visibility of the amount of animal food stored in the container 104.

The bottom container surface 104*e* includes a container opening 104*f* through which animal food moves from the interior storage chamber 104*g* of the container 104 into the food bowl 108. When the food bowl 108 is in the filling position of FIG. 1A, the container opening 104*f* is aligned with the housing opening 102*h*.

The bottom container surface 104*e* is shaped such that animal food is funneled toward the container opening 104*f*. Each bottom portion of the rear and side container surfaces 104*b*-104*d* is positioned at an elevation above the container opening 104*f* such that the bottom surface 104*e* slopes downwardly from the bottom portion of the respective container surface 104*b*-104*d* towards the container opening 104*f*. For example, a rear bottom inner surface of the interior storage chamber 104*g* of the container 104 slopes toward the container opening 104*f*. The angle of the bottom surface 104*e* adjacent to the side and rear container surfaces 104*b*-104*d* is sufficient to direct food towards the container opening 104*f*. In some embodiments, the bottom surface 104*e* between the bottom portions of the side and rear container surfaces 104*c*-104*e* forms a 45 degree angle relative to the bottom surface 102*e* of the housing 102. Support members 104*h* may be provided along the exterior of the container bottom surface 104*e* to provide structural support for the container 104.

Figure 9:
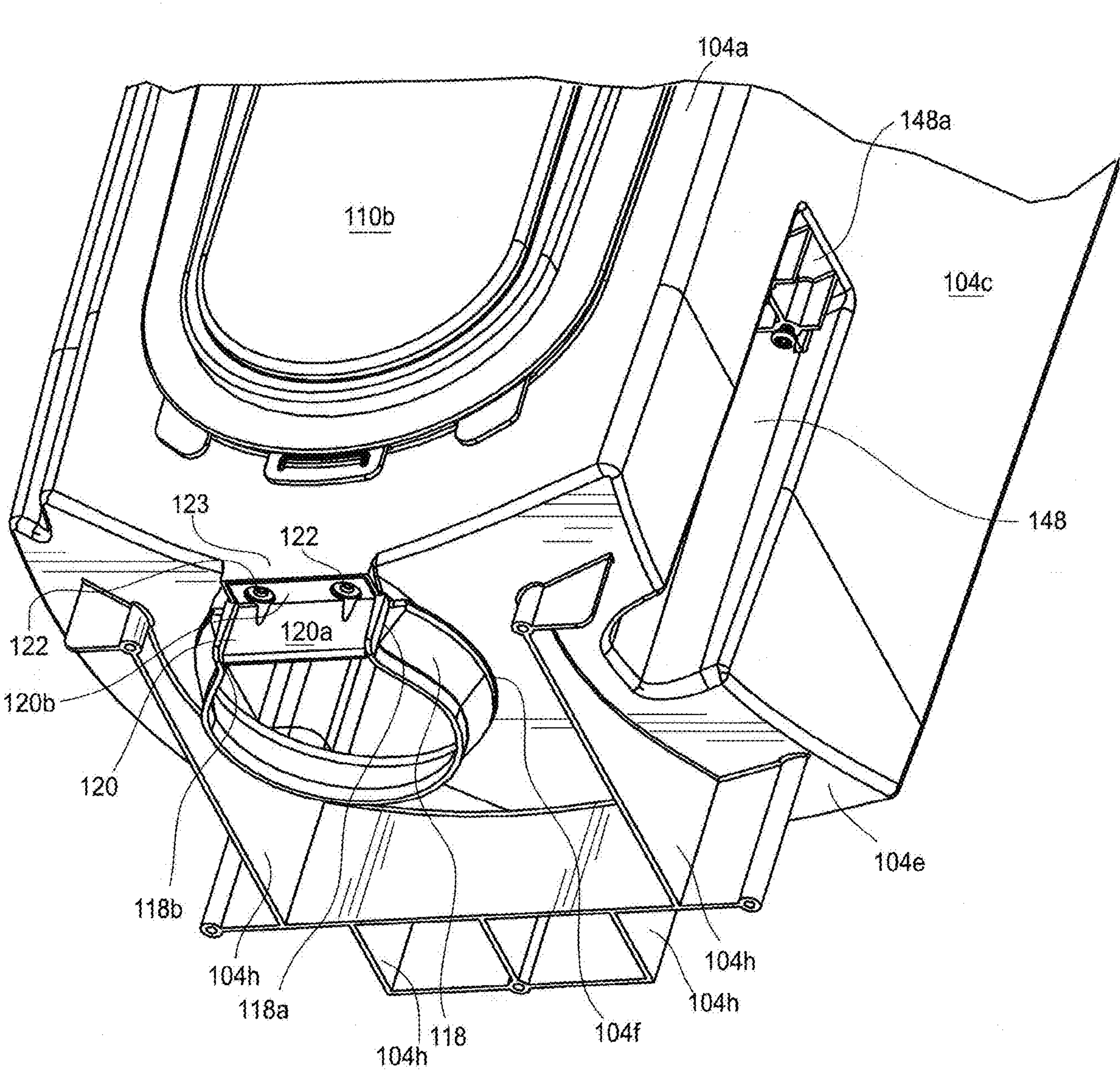
FIG. 9 is a perspective, partial view from below of the container of the dispensing device of FIGS. 1A and 1B.

Referring to FIG. 9, a wall 118 projects downwardly from the container opening 104*f* around a portion thereof. Specifically, the wall 118 extends around the container opening 104*f* along the side and rear container surfaces 104*b*-104*d*. Along the front container surface 104*a*, an anti-jam flap 120 extends downwardly from the container opening 104*f* between first and second ends 118*a*, 118*b* of the wall 118. In the illustrated embodiment, the wall 118 in combination with the anti-jam flap 120 surrounds the entirety of the container opening 104*f*.

In the illustrated embodiment, the anti-jam flap 120 includes a flap portion 120*a* and a mounting portion 120*b* extending from an upper edge of the flap portion 120*a*. Two connecting members 122 such as screws extend through the mounting portion 120*b* into a flap mount 123 within the front container surface 104*a*. A bottom edge of the anti-jam flap 118 is coplanar with a bottom edge of the wall.

During use, the container 104 holds a storage volume of animal food and directs a filling portion of the animal food into the food bowl in the sliding member 106. The anti-jam flap 120 comprises a flexible material such as rubber or any other suitable material so that when the sliding member 106 moves from the filling position to the serving position, the anti-jam flap 120 bends along with the food in the food bowl 108 and pushes the animal food down into the bowl 108 as the sliding member 106 is moved. In one embodiment, the anti-jam flap 120 contacts a top of the removeable serving bowl 108 when the sliding member 106 moves between the filling position and the serving position. In another embodiment, the anti-jam flap 120 does not contact a top of the removeable serving bowl 108 when the sliding member 106 moves between the filling position and the serving position.

Figure 12:
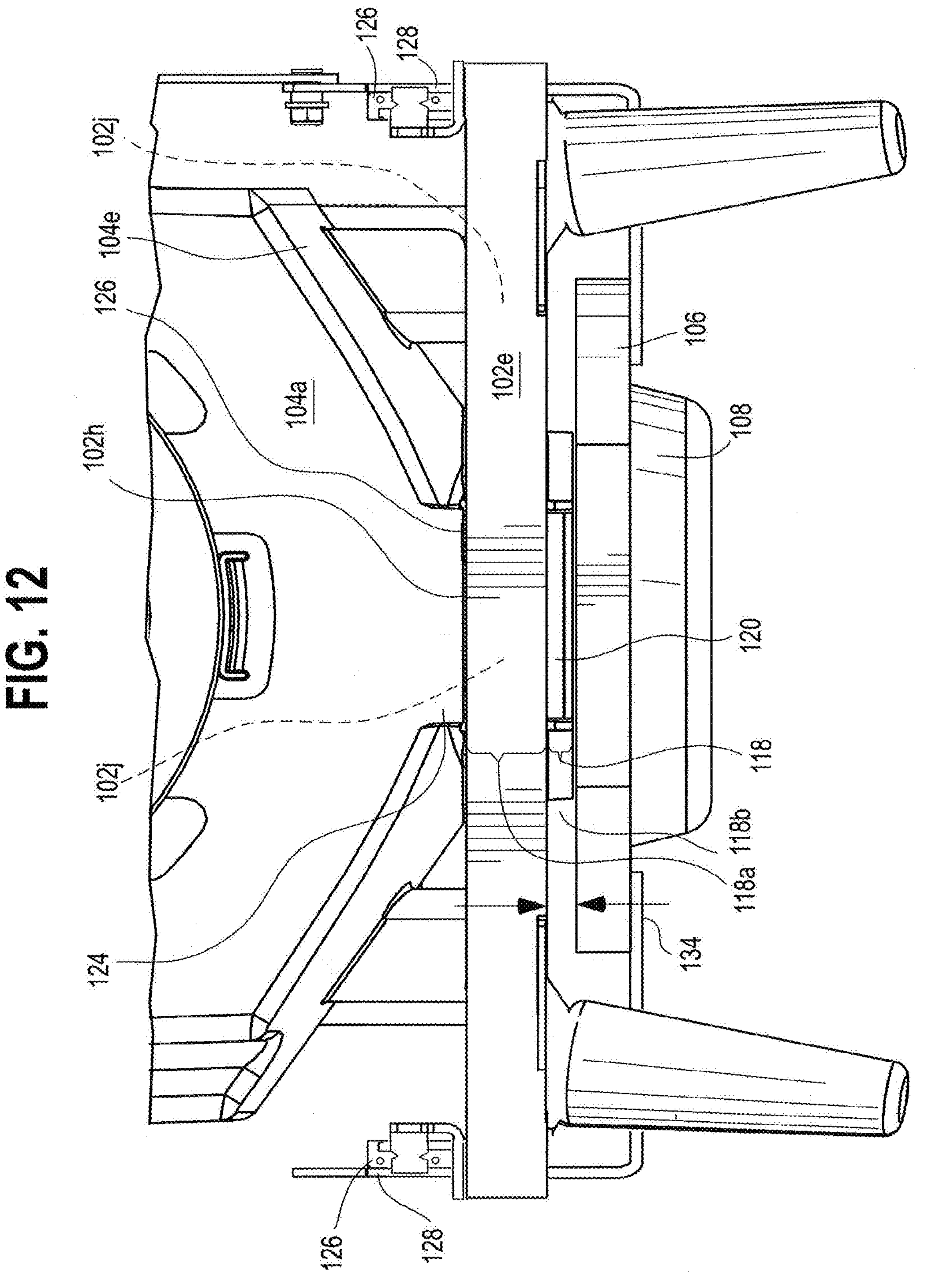
FIG. 12 is a partial, front elevational view of the container opening, the bottom surface of the housing, and the bowl support of the dispensing device of FIG. 1A.

During use, the container opening 104*f* is aligned with the passage 102*j* defined by the housing opening 102*h* of the housing 102, as seen in FIG. 12. More specifically, a first portion 118*a* of the wall 118 is located within the passage 102*j* and a second portion 118*b* of the wall 118 is located below the bottom surface 102*e* of the housing 102.

As shown in FIGS. 10A-11B, the sliding member 106 is positioned below the bottom surface 102*e* of the housing 102 and moves between the filling position and the serving position. One or more tracks 124 are positioned below the bottom surface 104*e* of the container 104 on opposing sides of the container opening 104*f*. In the illustrated embodiment, the one or more tracks 124 includes first and second tracks 124 provided on an upper side of the bottom surface 102*e* of the housing 102. The sliding member 106 includes first and second sliding member brackets 128 that are laterally moveable along the first and second tracks 124. In one embodiment, each sliding member bracket 128 includes a sliding member mount 126 that move along the respective track 124.

The tracks 124 may be secured to the bottom surface 102*e* of the housing 102 via methods known in the art and are formed from any structural material appropriate for durably allowing the sliding member 106 to slide along the tracks. For example, the tracks 124 may be made from a suitable metal with ball bearings. In another embodiment, the tracks 124 and the sliding member mounts 126 have the same magnetic pole such that the sliding member mounts 126 and the tracks 124 are magnetically forced apart, allowing the sliding member mounts 126 to slide along the tracks 124. Numerous known substitutes may be used, as will be recognized by those skilled in the art.

A first end 128*a* of each bracket 128 is connected to a sliding member mount 126 through a connector 130 such as one or more screws. A second end 128*b* of each bracket 128 is connected to a bottom surface of the sliding member 106 through attachment means 132 such as screws. Other suitable attachment means for connecting the bracket 128 to the sliding member mount 126 and/or the sliding member 106 such as a clamp, a quick release connector, an adhesive, or the like may be used. In the illustrated embodiment, the second end 128*b* of each bracket 128 includes an elongated planar surface, although a bracket 128 having any shape and size may be used.

Referring to FIG. 12, a gap 134 is provided between a lower surface of the bottom surface 102*e* of the housing 102 and an upper surface of the sliding member 106. The container opening 104*f* is aligned with the housing opening 102*h* and is sized such that the downwardly-projecting wall 118 and the anti-jam flap 120 extend from the container opening 104*f* through the housing opening 102*h*. Bottom surfaces of the wall 118 and the anti-jam flap 120 are positioned below the lower surface of the bottom surface 102*e* of the housing 102. In some embodiments, bottom surfaces of the wall 118 and the anti-jam flap 120 are positioned slightly above the upper surface of the sliding member 106 as shown in FIG. 12. In the illustrated embodiment, the gap 134 is sized to block standard size kibble or animal food from being caught within the gap 134 as the sliding member 106 is moved from the filling position to the serving position. While the anti-jam flap 120 operates to maintain a level of animal food in the bowl 108 below the bottom surface 102*e* of the housing 102, the gap 134 is sized to provide an additional back stop to prevent animal food from jamming the area between the bottom surface 102*e* of the housing 102 and the sliding member 106. In some embodiments, the gap may be about 0.75 in for large-sized kibble, about 0.5 in for medium-sized kibble, and about 0.25 in for small-sized kibble. In other embodiments, the gap may be smaller or larger depending on the animal feed used with the dispensing device 100. For example, a dispensing device 100 used for storage of bird seed may include a smaller gap than those listed above. Similarly, storage of a larger sized material may require a larger gap than those listed above.

Figure 10A:
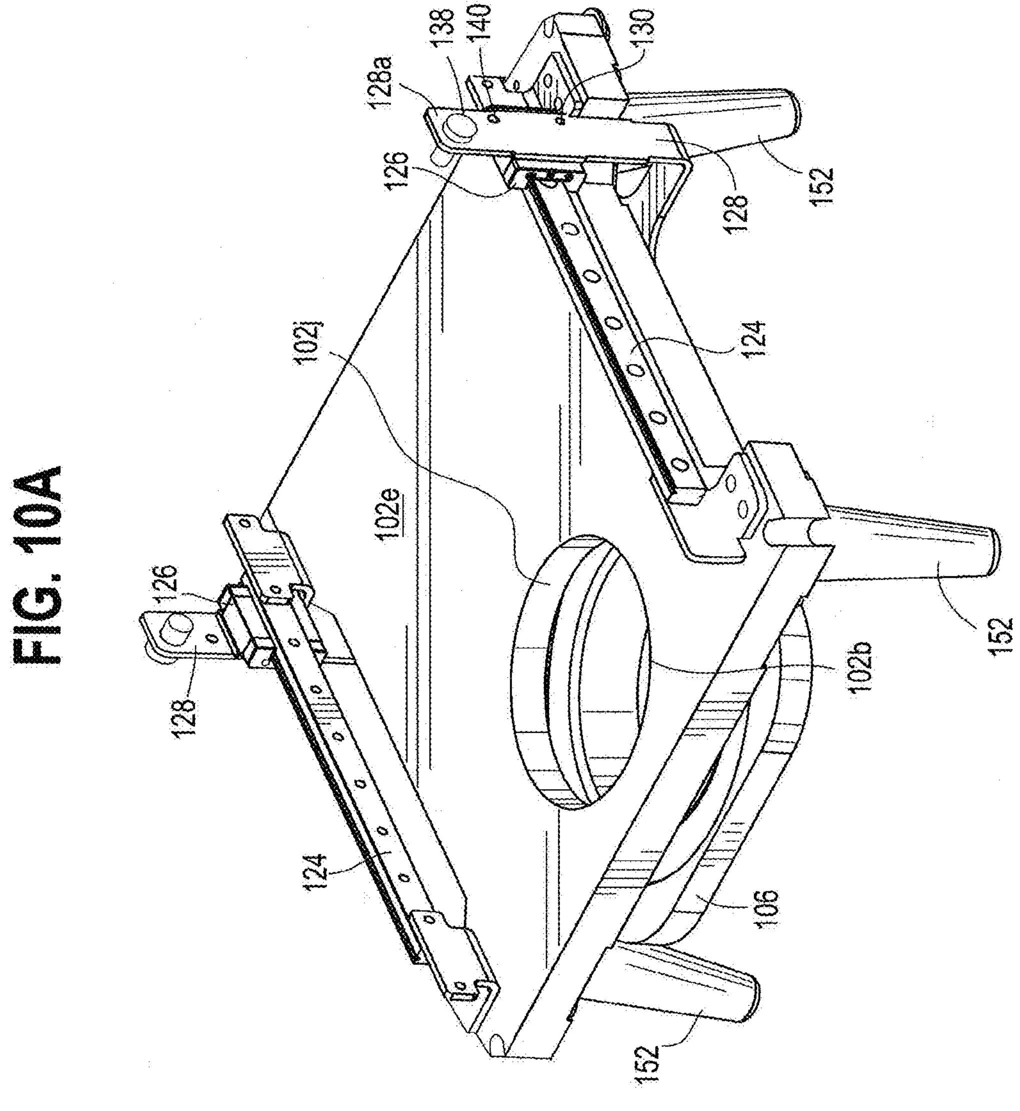
FIGS. 10A and 10B are perspective views from above of a bottom surface of the housing of the dispensing device of FIGS. 1A and 1B, showing the food bowl in the filling position and the serving position, respectively.
Figure 10B:
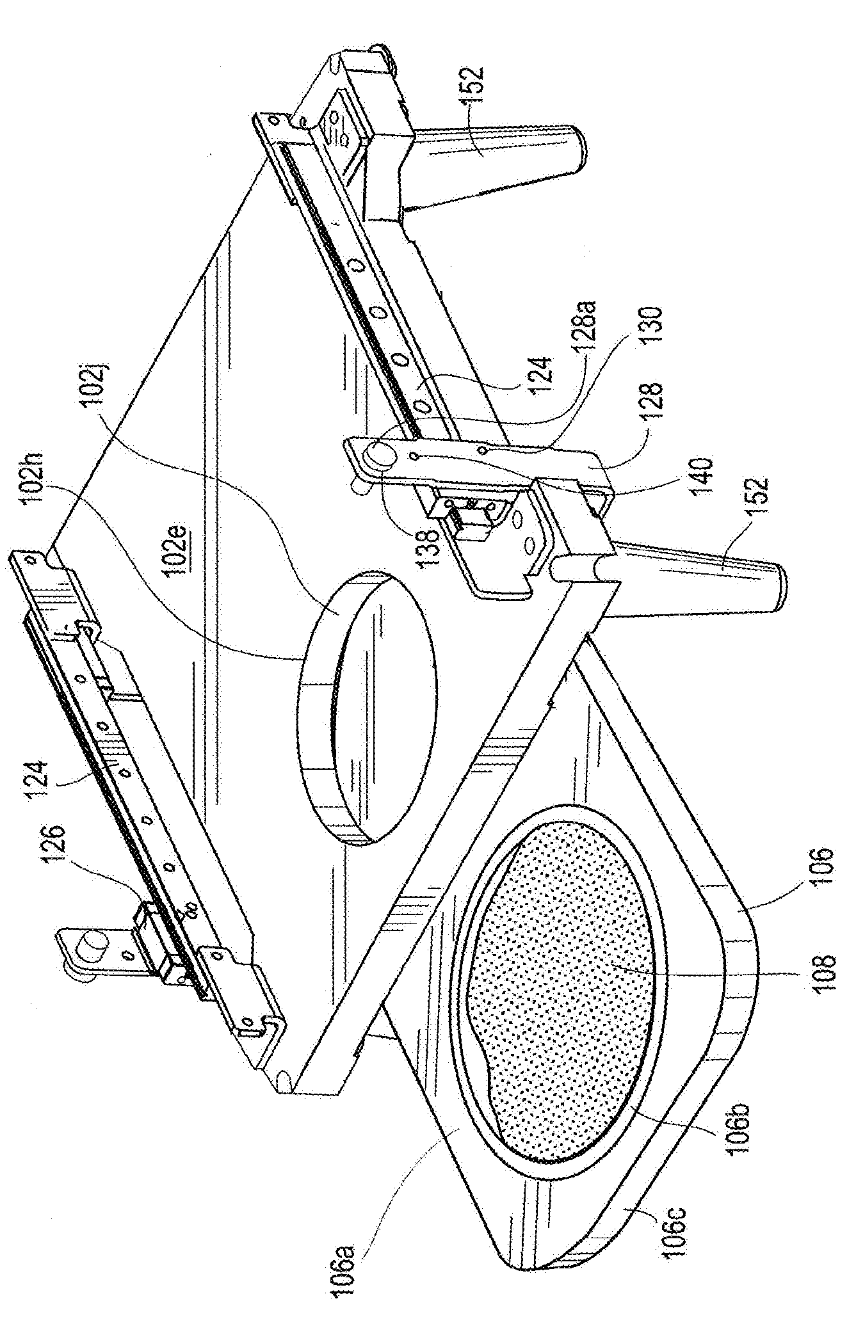
Figure 11A:
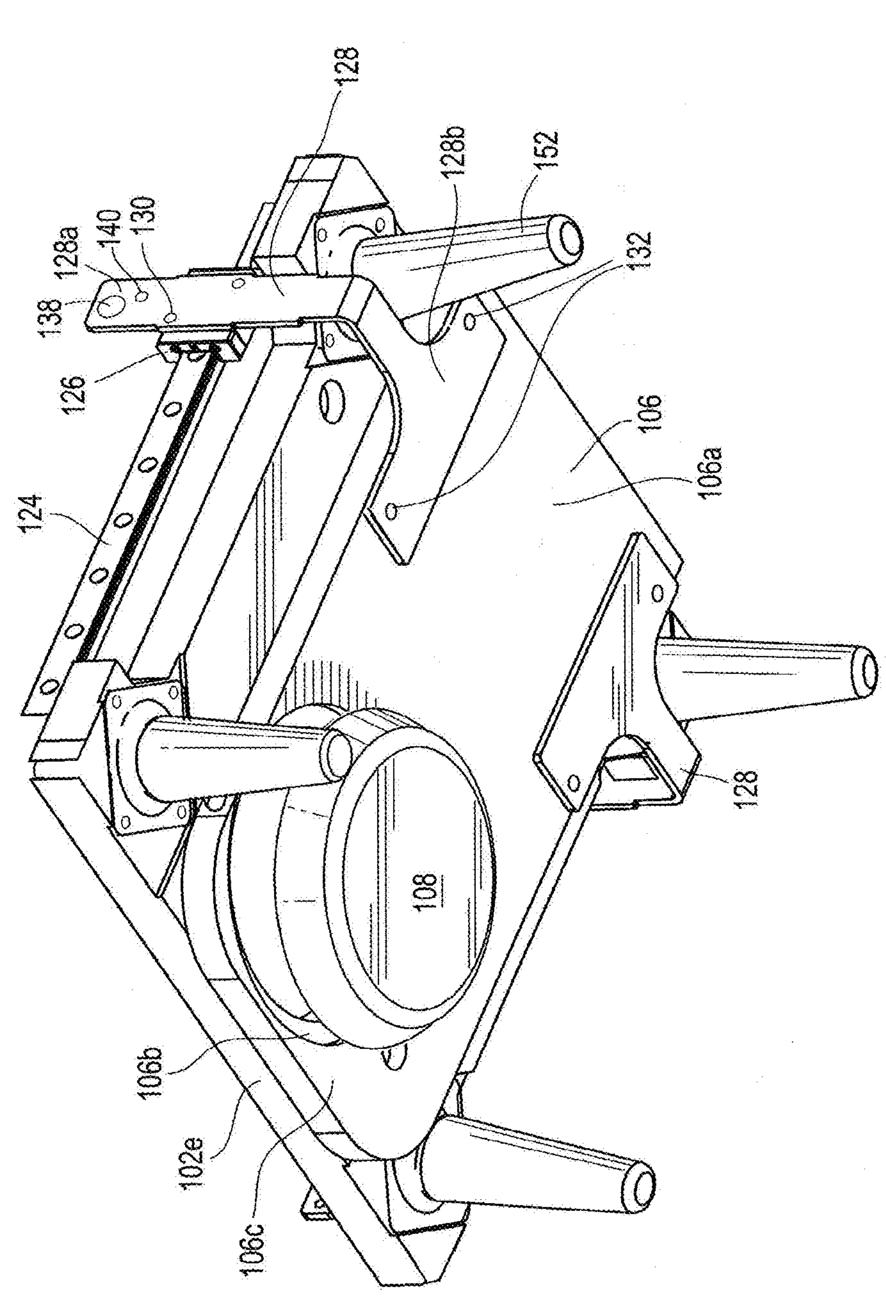
FIGS. 11A and 11B are perspective views from below of the bottom surface of the housing of the dispensing device of FIGS. 1A and 1B, showing the food bowl in the filling position and the serving position, respectively.
Figure 11B:
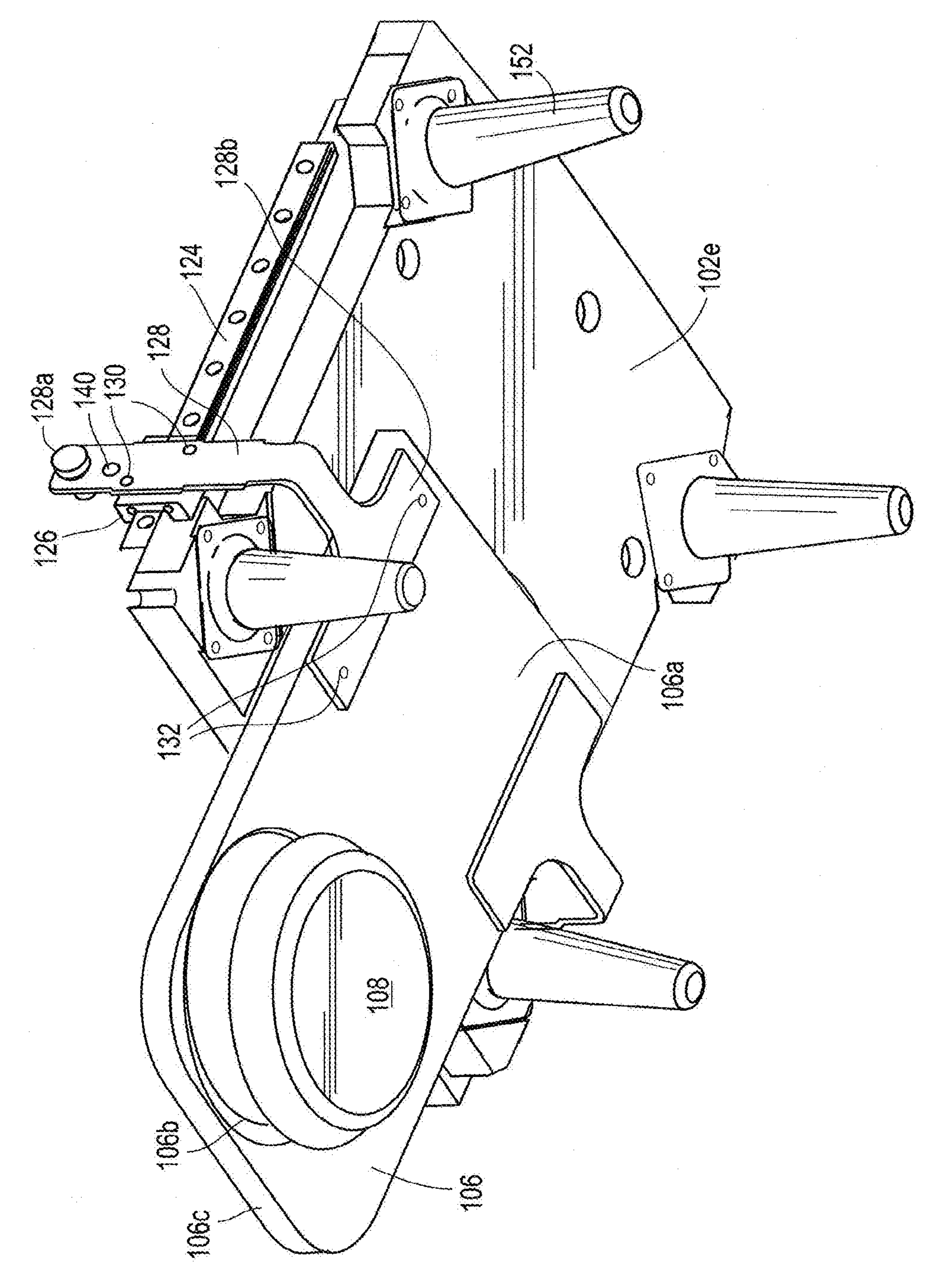

When the sliding member 106 is in the serving position as shown in FIGS. 10B and 11B, the animal food remaining in the container 104 rests on the planar portion of the sliding member 106 that spans the container opening 104*f*. When the sliding member 106 moves from the serving position to the filling position, the planar portion of the sliding member 106 moves rearward of the container opening 104*f*, moving the bowl opening 106*b* of the sliding member 106 under the container opening 104*f* as shown in FIGS. 10A and 11A. As the sliding member 106 slides into the filling position, the animal food that is positioned within the wall 118 and anti-jam flap 120 below the container opening 104*f* falls into the empty food bowl 108. A further filling portion is then fed into the food bowl 108 from the storage volume within the storage container 104.

Figure 6:
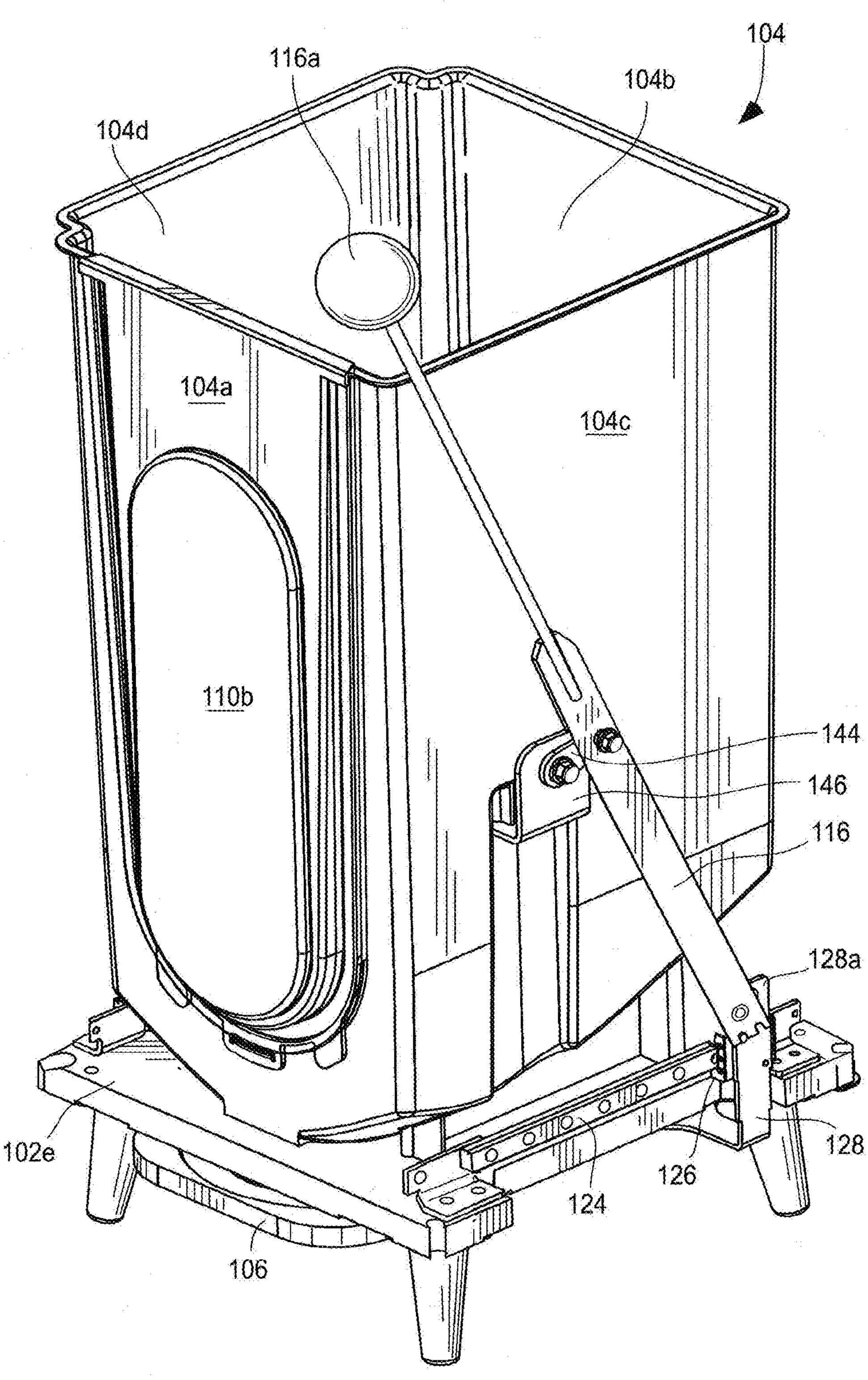
FIG. 6 is a perspective view of the internal components of the dispensing device of FIG. 1A.
Figure 7:
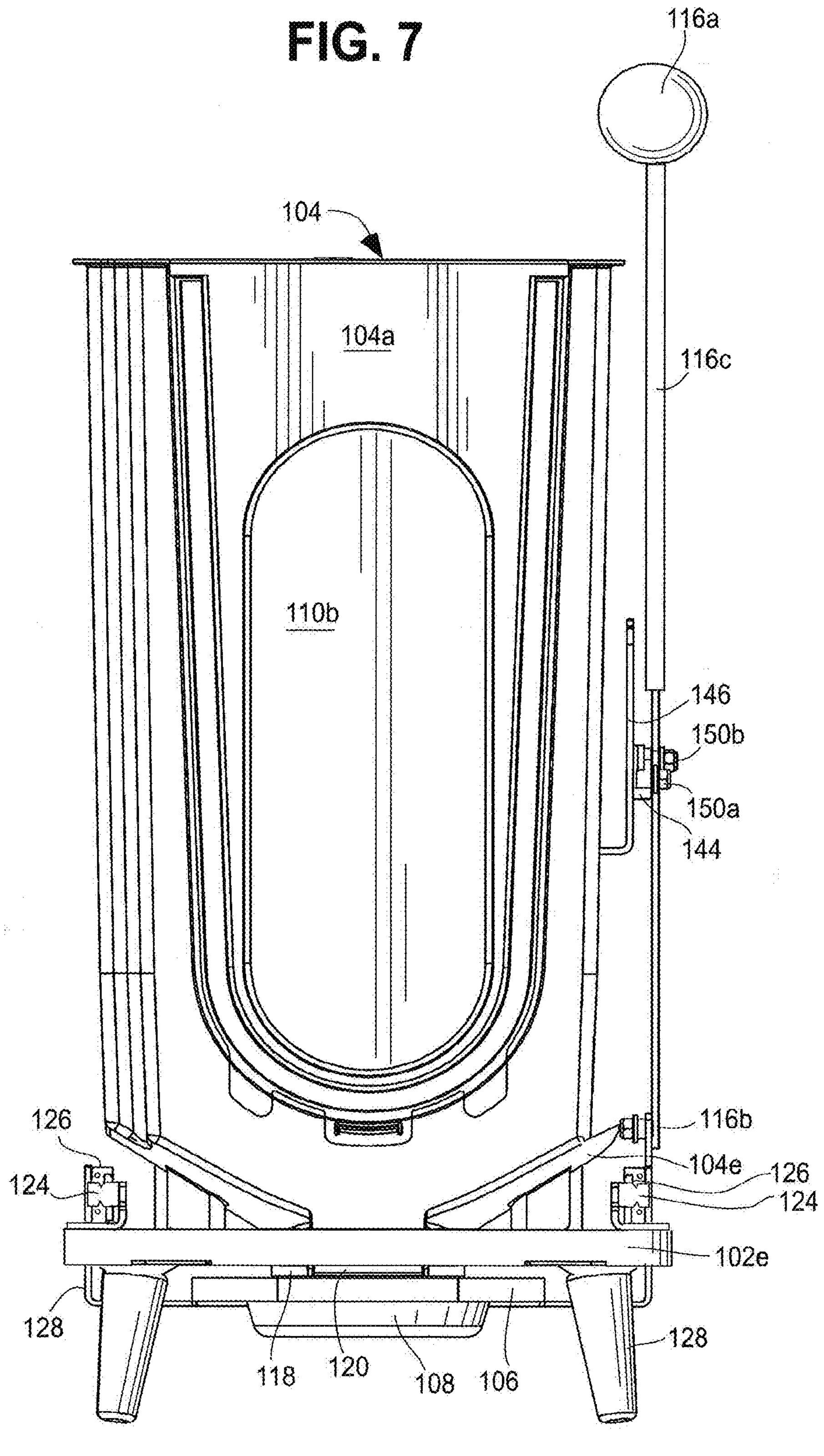
FIG. 7 is a front elevational view of the internal components of the dispensing device of FIG. 6.
Figure 8:
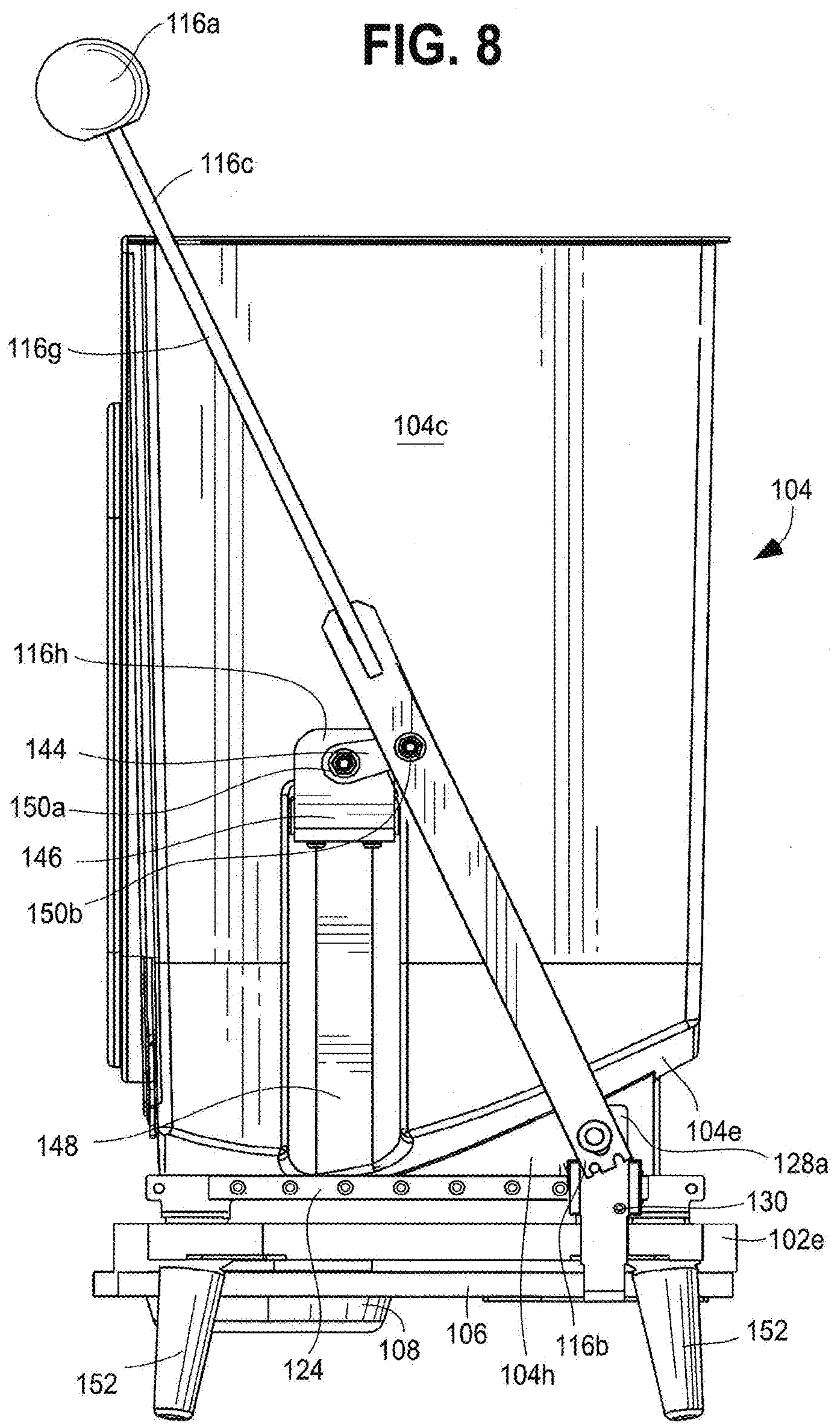
FIG. 8 is a side elevational view of the internal components of the dispensing device of FIG. 6.

As noted above, the lever 116 enables the pet owner to move the sliding member 106 between the filling and serving positions. Upon applying force or manual manipulation to a first lever end 116*a*, the second lever end 116*b* also moves, causing the sliding member 106 to slide along the one or more tracks 124. The lever 116 includes a lever body 116*c* between the first lever end 116*a* positioned above the top surface 102*f* of the housing 102. In the illustrated embodiment, a round handle is provided on the first lever end 116*a*. The second lever end 116*b* of the lever body 116*c* engages with the first end 128*a* of the first sliding member bracket 128 as shown in FIG. 6.

The lever 116 is operably coupled to the sliding member 106 such that when the first lever end 116*a* is in a first position as shown in FIG. 1A, the sliding member 106 is in the filling position and the bowl support 106*a* aligns the bowl 108 and the container opening 104*f*, and when the first lever end 116*a* is in a second position as shown in FIG. 1B, the sliding member 106 is in the serving position and the bowl support 106*a* positions the bowl 108 in front of the container 104 and/or housing 102.

Figure 13A:
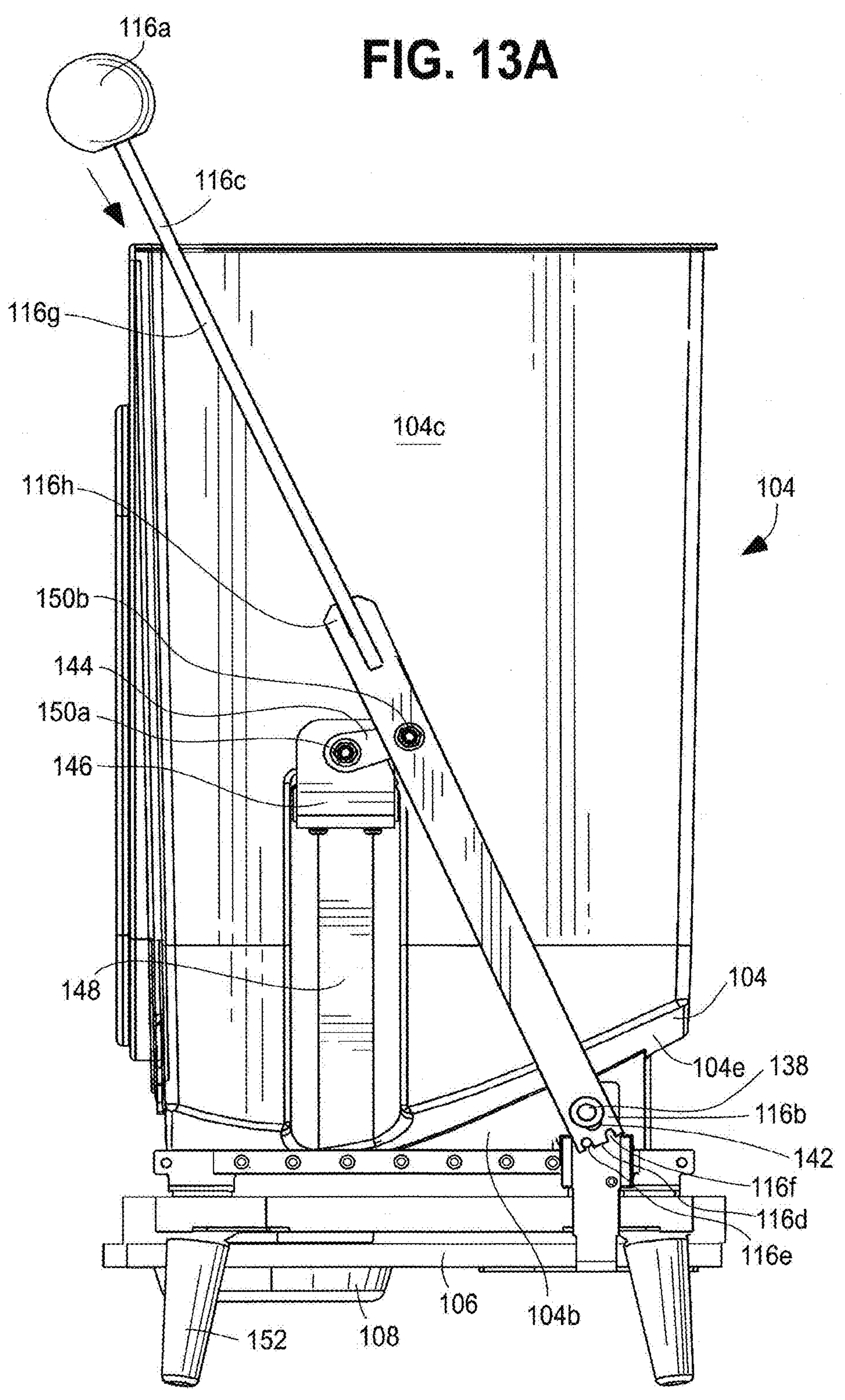
FIGS. 13A and 13B illustrate the lever in a locked position and an unlocked position, respectively.
Figure 13B:
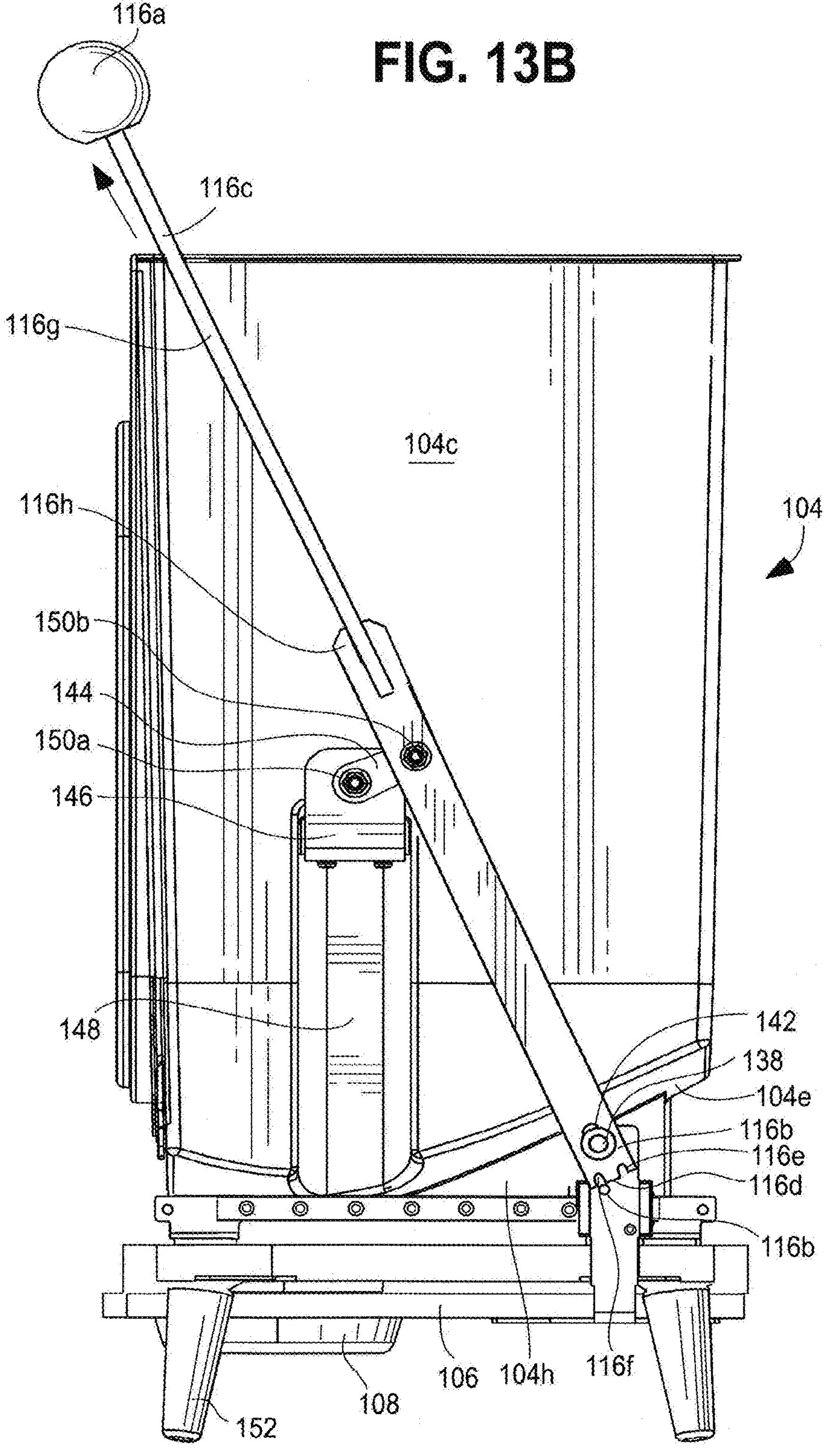

More specifically, initiating movement of the lever 116 between the filling position and the serving position requires a first force to be applied along a first vector followed by a second force applied along a second vector. The first force is pulling the first lever end 116*a* upwardly, away from the housing 102 and/or container 104, as shown in FIGS. 13A and 13B. The second force is moving the first lever end 116*a* between ends of the slotted opening 114*b* in the top surface 102*f* of the housing 102. This movement causes the first lever end 116*a* to travel along an arc as the first lever end 116 pivots about a pivoting arm 144 described below.

Figure 14:
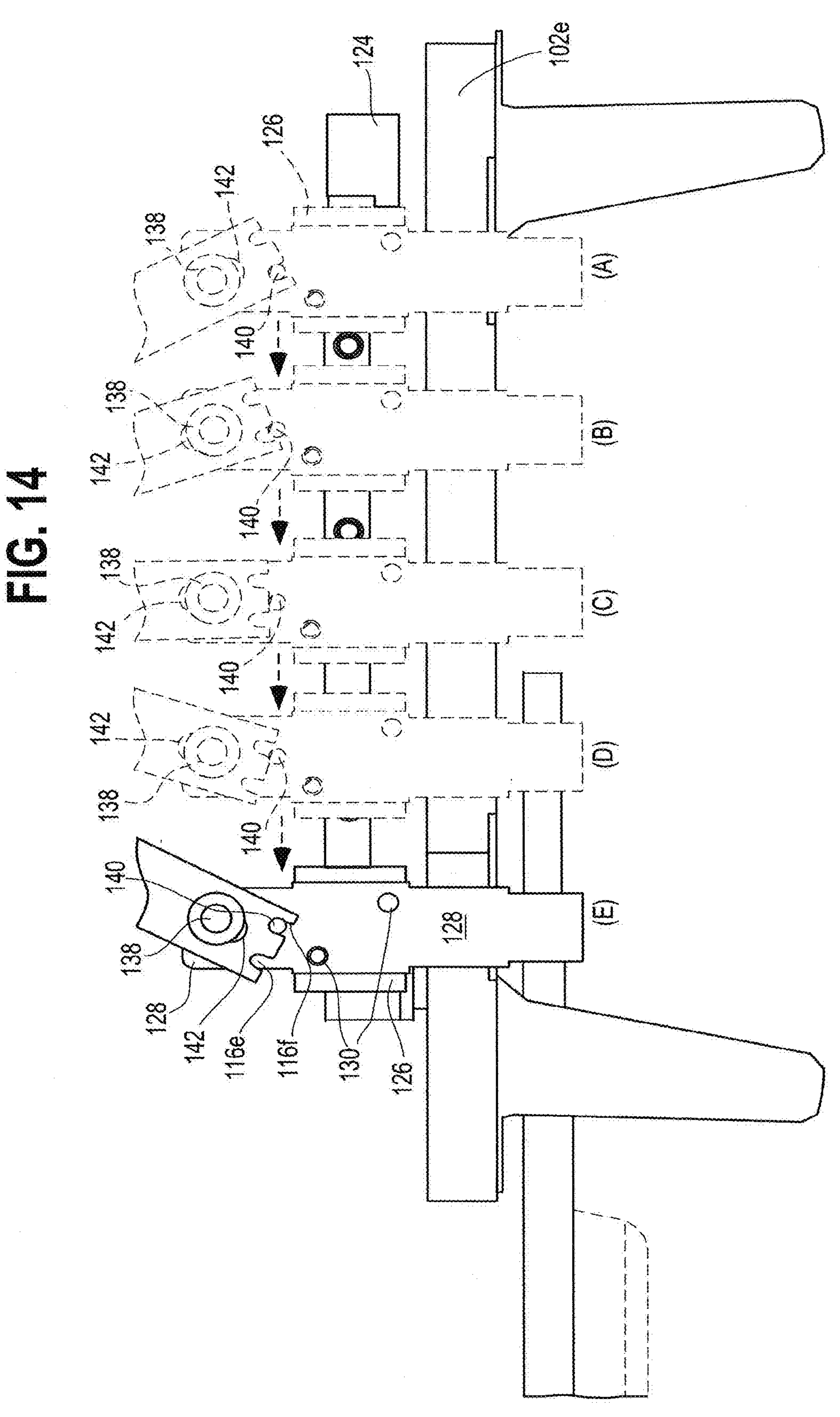
FIG. 14 illustrates the sliding members of the dispensing device of FIGS. 1A, 1B, and 6 moving between the locked position of the filling position and the locked position of the service position.

Referring to FIGS. 13A-14, the lever 116 includes a locking mechanism 136 that locks the sliding member 106 in the filling position or the serving position, preventing free movement of the first lever end 116*a* out of the first or second positions of FIG. 1A or 1B. When the sliding member 106 is positioned in the filling position or the serving position, the sliding member brackets 128 are in a first position A of FIG. 14, adjacent to the rear surface 102*b* of the housing 102, or a second position E of FIG. 14, adjacent to the front surface 102*a* of the housing 102.

FIGS. 13A and 13B illustrate the lever 116 in the locked and unlocked positions of position A. In the locked positon of FIG. 13A, the lever body 116*c* is positioned downwardly and the locking mechanism 136 is engaged. Gravity causes engagement of the lever 116 with the locking mechanism 136 into the locked position. In the unlocked position of FIG. 13B, the first lever end 116*a* is pulled upwardly away from the top surface 102*f* of the housing 102 and the locking mechanism 136 is disengaged. To move the lever 116 in and out of the locked positions, the pet owner grips the first lever end 116*a* and pulls the lever body 116*c* upwardly away from the dispensing device 100.

As seen in FIG. 14, the second lever end 116*b* engages with the first end 128*a* of the sliding member bracket 128, specifically with a connecting pin 138 and a locking pin 140 mounted to the sliding member bracket 128. The connecting pin 138 passes through a slot 142 in the second lever end 116*b*, securing the sliding member bracket 128 to the lever 116 while enabling rotation of the sliding member bracket 128 with respect to the lever 116 and also enabling translation of the lever 116 with respect to the sliding member bracket 128 such that the connecting pin 138 may be located towards a first end 142*a* of the slot 142 or towards a second end 142*b* of the slot 142. The slot 142 passes through the second lever end 116*b* from a first side of the lever 116*c* to a second side of the lever 116*c*. A lever bottom end surface 116*d* of the second lever end 116*b* includes first and second locking notches 116*e*, 116*f* configured to receive the locking pin 140 of the sliding member bracket 128. Movement of the lever body 116*c* is limited through an attachment to a pivot arm 144 along a length of the lever body 116*c*, as described below.

When the lever 116 is in the first position, the locking pin 140 is located within the first locking notch 116*e* and the connecting pin 138 is located towards the first end 142*a* of the slot 142. When the lever 116 is in the second position, the locking pin 140 is located within the second locking notch 116*f* and the connecting pin 138 is located again towards the first end 142*a* of the slot 142. The connecting pin 138 must be located towards the second end 142*b* of the slot 142 for the lever 116 to move between the first position and the second position.

When the lever body 116*c* is in a locked position as shown in positions A and E of FIG. 14, the locking pin 140 is received within one of the locking notches 116*e*, 116*f*. When the lever body 116*c* is in an unlocked position as shown in positions B-D and is moving between locked positions, the locking pin 140 is positioned below the lever bottom end surface 116*d* of the second lever end 116*b* between the locking notches 116*e*, 116*f*.

The pivot arm 144 is attached to a lever mount 146 that is secured to the container 104 as shown in FIGS. 13A and 13B. In the illustrated embodiment, the container 104 includes an indentation 148 forming a ledge 148*a* (FIG. 9) within a side surface 104*c*. In the illustrated embodiment, the lever mount 146 is an L-shaped bracket that is attached to the ledge 148*a* using screws or any other suitable connection means. In other embodiments, the lever mount 146 may comprise a panel or other member that is attached to the side surface 104*c* using spacers and screws or any other suitable connection means.

The pivot arm 144 is rotatably connected to the lever mount 146 through a first connector 150*a* and is rotatably connected to the lever body 116*c* through a second connector 150*b*. The pivot arm 144 provides flexibility in the pivoting motion of the lever body 116*c* about the lever mount 144 so that the lever body 116 can be pulled in and out of the locked positions as well as rotate about the lever mount 144 to move the sliding member 106 between the filling and serving positions. Movement of the first lever end 116*a* between the first and second positions shown in FIGS. 1A and 1B causes the lever body 116*c* to rotate about the lever mount 146. In some embodiments, the rotation of the lever 116 about the lever mount 146 facilitates movement of the connecting pin 138 within the slot 142.

In one embodiment, the lever body 116*c* includes a first lever portion 116*g* and a second lever portion 116*h* secured to one another along a length of the lever body 116*c*, forming a continuous body. The lever body 116*c* may include any number of connecting members, and may extend from an upper surface, from a sides surface, away from a surface, or operate in any configuration as desired. In yet another embodiment, the lever 116 is a foot pedal positioned at floor level that is attached to the bowl support. To be used, the pet owner places their foot on the pedal and applies force to slide the bowl support along the tracks between the filling position and the serving position.

Referring back to FIGS. 11A and 11B, the food bowl 108 is secured to the sliding member 106 that moves along the first and second tracks 124 on the bottom surface 102*e* of the housing 102. In the illustrated embodiment, the sliding member 106 includes a planar bowl support 106*a* with a leading portion 106*c* that is distal from the storage container 104 when the food bowl 108 is in the serving position. The bowl support 106*a* includes a bowl opening 106*b* adjacent to the leading portion 106*c*. An upper edge of the food bowl 108 is received by the bowl opening 106*b* such that the food bowl 108 extends below the sliding member 106.

The bowl opening 106*b* on the sliding member 106 is sized to receive the food bowl 108. In one embodiment, an upper edge of the food bowl provides a ledge or surface that rests atop an inner edge of the bowl opening 106*b* on the sliding member 106. The bowl opening 106*b* within the sliding member 106 may include a shouldered surface at the inner edge so that a top surface of the upper edge of the food bowl 108 is coplanar with the surrounding planar surface of the sliding member 106. To use a food bowl 108 having a diameter smaller than a diameter of the bowl opening of the sliding member 106, a bowl sizing insert may be used. An outer diameter of the bowl sizing insert corresponds to the diameter of the bowl opening, and a central opening within the bowl sizing insert has a diameter corresponding to the diameter of the smaller food bowl. The outer edge of the bowl sizing insert may have a shouldered surface that mates with the shouldered surface of the bowl opening 106*b* of the sliding member 106. Any number of food bowl sizing inserts may be provided to accommodate a variety of food bowl sizes. Further, a plurality of concentric food bowl sizing inserts, including a smaller food bowl sizing insert that sits within a larger food bowl sizing insert, may be provided to accommodate a variety of food bowl sizes.

The pet owner may able to control the amount of food provided to their pet at each feeding by using inserts in the food bowl 108 to adjust the volume, which is particularly helpful as the dispensing device fills the food bowl completely. A planar insert that spans the width of the food bowl decreases the volume of the food bowl. The planar insert may include legs and can be positioned with the legs extending downwardly or upwardly. To maximize the decrease in volume, more than one insert may be used by positioning the legs downwardly and stacking the inserts. A small decrease in volume results when the planar insert is positioned with the legs extending upwardly. A slow feed insert may include protrusions extending upwardly from a base surface to slow down the pet's intake by forcing the pet to eat around the protrusions. Any number of inserts in any orientation may be used as desired to reach the intended volume.

When the sliding member 106 is in the filling position as shown in FIG. 1A, the bowl opening 106*b* is below the housing and container openings 102*h*, 104*f*, allowing animal food to flow into the food bowl by gravity. When the sliding member 106 is in the serving position as shown in FIG. 1B, the leading edge 106*c* of the sliding member 106, along with the bowl opening 106*b* and food bowl 108, extends outwardly from the housing 102, and the bowl support 106*a* of the sliding member 106 is positioned under the housing and container openings 102*h*, 104*f* as shown in FIG. 13, blocking animal food from flowing out of the container.

The bowl opening 106*b* in the sliding member 106 and/or the food bowl 108 may have a diameter or shape that corresponds at least in part to the housing and container openings, although the dimensions of the bowl opening, food bowl, and housing and container openings can vary. For example, the bowl opening may be either slightly larger or smaller than the storage container opening. Such variation does not impact the functioning of the dispensing device. The shapes and sizes of the holes and bowl may correlate to commercially available feeding bowls.

The housing 102 may have as many or as few sides as necessary to ensure the same functionality with the overall aesthetic preferred by the user. In some embodiments, the housing and/or container may have a rounded shape, a funneled shape, or any other configuration of planar walls. The housing and/or container may be formed from any structural material appropriate for sustaining its structure while filled with food. For example, the container may be made from a suitable polymer such as PET (polyethylene terephthalate), various types of wood, or metal. The housing may be made from plastic, wood, or metal. Numerous known food-safe substitutes may be used, as will be recognized by those skilled in the art. Further, the inner surfaces of the container may have a surface treatment to serve a particular function: hydrophobic, hydrophilic, oleophobic, oleophilic, or a combination there of such that the interior of the container is anti-microbial, anti-fungal, or prevents food from sticking to the materials on the inside of the container.

The bottom surface 102*e* of the housing 102 and the sliding member 106 can be positioned at any height from the ground while the device operates in substantially the same matter. Four legs 152 are attached to the four corners of the bottom surface of the housing and, in some embodiments, the housing is provided with a set of short legs and a set of long legs. The desired height of the bowl support depends on the requirements of the eating animal, for example some dogs required to eat food elevated from the ground and can do so safely via the present disclosure.

In another embodiment, the housing 102 may be housed on lockable wheels for easy maneuverability or similar method of transfer from one location to another without having to drag the device along the floor. In another embodiment, the top side wall, the front wall, and each of the side walls may include a handle to further ease maneuverability of the device if needed. The handle may comprise the same material as the container itself, however, a variety of appropriate handles made of a different material as the container is possible, such as rope. In another embodiment, the container further comprises an electrical system equipped with a control panel to maintain a specific temperature, humidity, and/or pressure while storing food.

It should be noted that various changes and modifications to the presently preferred embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

What is claimed is:

1. A dispensing device comprising:
- a container defining an interior storage chamber and a container opening providing access to the interior storage chamber;
- a bowl supported by a moveable bowl support, wherein the moveable bowl support is configured to move the bowl between a filling position aligned with the container opening and a serving position in front of the container housing; and
- an actuator including a first end and a second end, wherein the second end operates to move the moveable bowl support;
- wherein, when the first end of the actuator is in a first position, the moveable bowl support positions the bowl in the filling position;
- wherein, when the first end of the actuator is in a second position, the moveable bowl support positions the bowl in the serving position.

2. The dispensing device of claim 1, further comprising a locking mechanism preventing free movement of the first end out of the first position or the second position.

3. The dispensing device of claim 1, wherein the actuator includes a locking mechanism comprising:
- a first locking notch and a second locking notch located in a bottom end surface of the actuator;
- a slot passing through the second end from a first side of the actuator to a second side of the actuator;
- a sliding member bracket including a locking pin; and
- a connecting pin passing through the slot and securing the sliding member bracket to the actuator while enabling rotation of the sliding member bracket with respect to the actuator and also enabling translation of the actuator with respect to the sliding member bracket such that the connecting pin may be located towards a first end of the slot or towards a second end of the slot;
- wherein, when the actuator is in the first position, the locking pin is located within the first locking notch and the connecting pin is located towards the first end of the slot, when the actuator is in the second position, the locking pin is located within the second locking notch and the connecting pin is located towards the first end of the slot, and the connecting pin must be located towards a second end of the slot for the actuator to move between the first position and the second position.

4. The dispensing device of claim 3, wherein the actuator further includes a mount secured to the container and a pivot arm, wherein a first end of the pivot arm is rotatably connected to the mount and a second end of the pivot arm is rotatably connected to an actuator body; and wherein movement of the first end between the first and second positions causes the actuator to rotate about the mount.

5. The dispensing device of claim 4, wherein the rotation of the actuator about the mount facilitates movement of the connecting pin within the slot.

6. The dispensing device of claim 1, further comprising a housing defining an inner volume, wherein the housing includes a housing opening providing a passage to the inner volume, wherein the container opening is aligned with the passage.

7. The dispensing device of claim 6, further comprising one or more tracks located below the container, and wherein the one or more tracks includes first and second tracks located on opposing sides of the opening on the upper side of a housing bottom surface.

8. The dispensing device of claim 6, further comprising a wall surrounding a portion of the container opening below a bottom surface of the container.

9. The dispensing device of claim 8, wherein a first portion of the wall is located within the passage and a second portion of the wall is located below the bottom surface of the housing.

10. The dispensing device of claim 9, wherein the wall, in combination with a flexible flap, surrounds the entirety of the container opening.

11. The dispensing device of claim 10, wherein there is a gap between a top of a sliding member and the bottom surface of the housing.

12. The dispensing device of claim 1, wherein a rear bottom inner surface of the interior storage chamber slopes towards the container opening.

13. The dispensing device of claim 1, wherein a front surface of the container includes a window through which a portion of the interior storage chamber can be seen.

14. The dispensing device of claim 1, wherein the housing includes a sealable lid providing access to the interior storage chamber.

15. The dispensing device of claim 1, wherein the bowl is removable from the bowl support.

16. A dispensing device comprising:

a housing;

a storage chamber located within the housing, the storage chamber including an opening;

a bowl supported by a moveable bowl support; and an actuator operable to move the moveable bowl support between a filling position and a serving position; and wherein initiating movement of the actuator between the filling position and the serving position requires a first force to be applied along a first vector followed by a second force applied along a second vector.

17. The dispensing device of claim 16, wherein a flexible flap contacts a top of the bowl when the moveable bowl support moves between the filling position and the serving position.

18. The dispensing device of claim 16, wherein a flexible flap does not contact the top of the bowl when the moveable bowl support moves between the filling position and the serving position.

19. The dispensing device of claim 16, wherein the bowl is a removeable serving bowl.

20. The dispensing device of claim 16, wherein the actuator includes a first end and a second end opposite the first end, and wherein the actuator includes a locking mechanism comprising:

a first locking notch and a second locking notch located in a bottom end surface of the actuator;

a slot passing through the second end from a first side of the actuator to a second side of the actuator;

a sliding member bracket including a locking pin; and a connecting pin passing through the slot and securing the sliding member bracket to the actuator while enabling rotation of the sliding member bracket with respect to the actuator and also enabling translation of the actuator with respect to the sliding member bracket such that the connecting pin may be located towards a first end of the slot or towards a second end of the slot;

wherein, when the actuator is in a first position, the locking pin is located within the first locking notch and the connecting pin is located towards the first end of the slot, when the actuator is in a second position, the locking pin is located within the second locking notch and the connecting pin is located towards the first end of the slot, and the connecting pin must be located towards a second end of the slot for the actuator to move between the first position and the second position.

* * * * *